Figure 2:
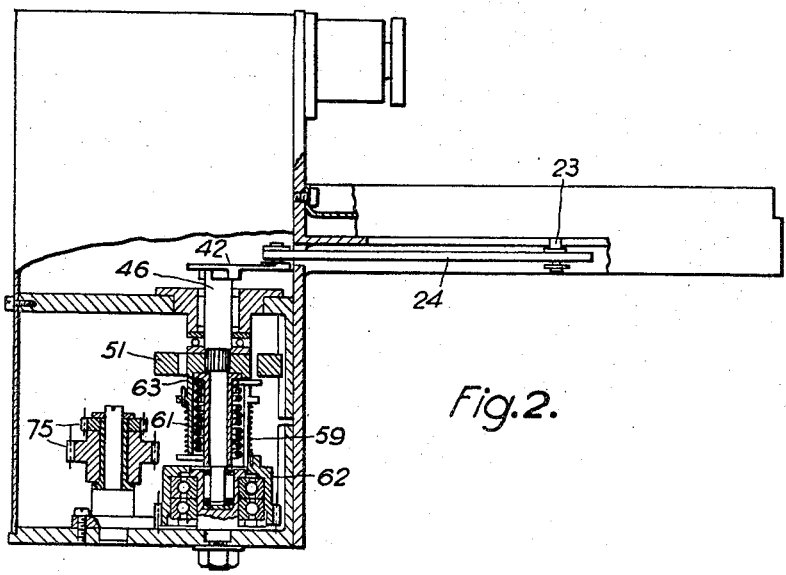

Sept. 3, 1963  E. C. WOODCOCK  3,102,462
PHOTOGRAPHIC SHUTTERS
Original Filed March 24, 1955  2 Sheets-Sheet 1
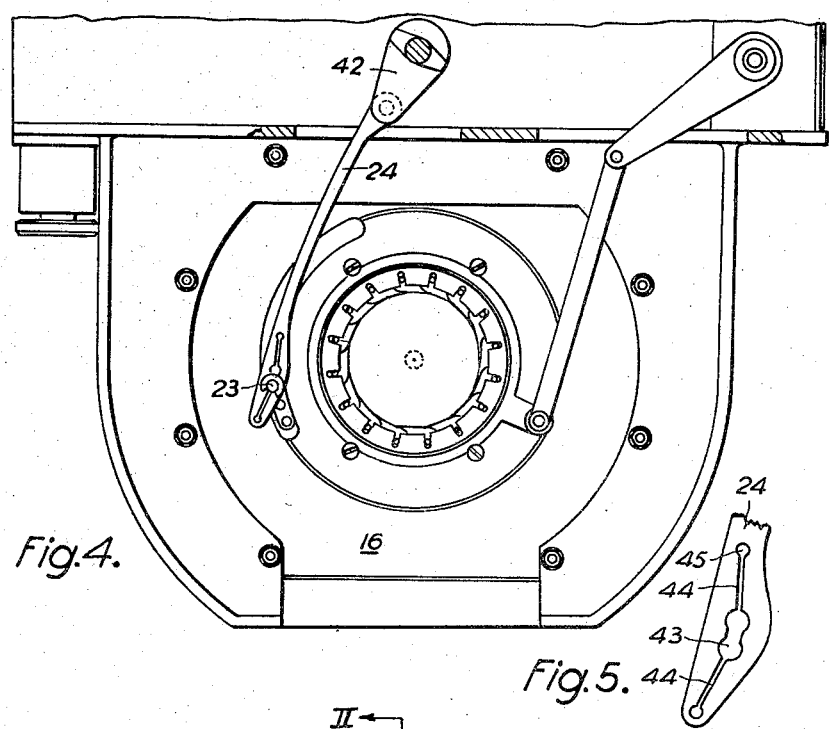
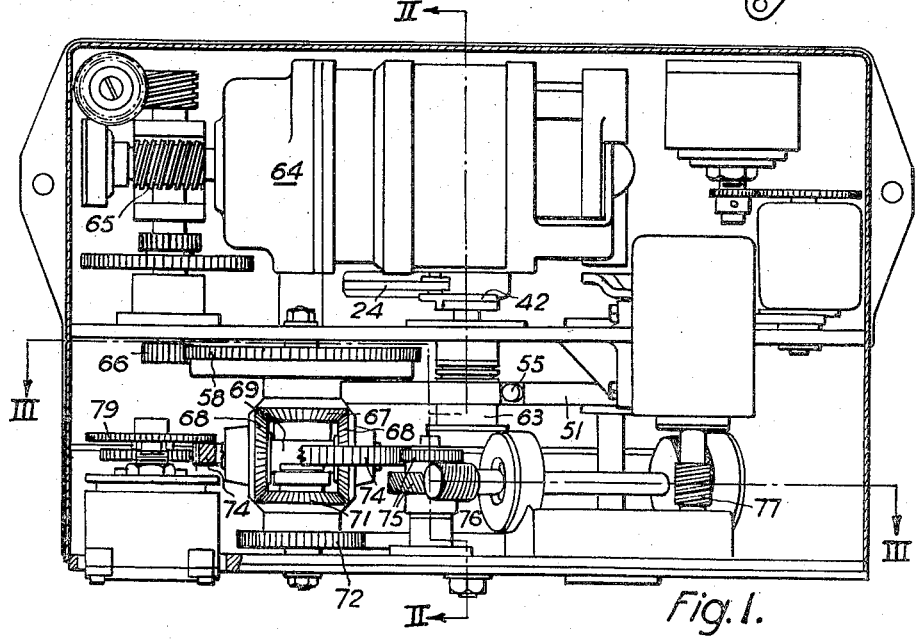
INVENTOR
Edward Cecil Woodcock
BY
ATTORNEY

United States Patent Office 3,102,462
Patented Sept. 3, 1963

3,102,462
PHOTOGRAPHIC SHUTTERS
Edward Cecil Woodcock, Pinner, England, assignor to Williamson Manufacturing Company Limited, London, England, a company of Great Britain
Original application Mar. 24, 1955, Ser. No. 496,383, now Patent No. 2,916,979, dated Dec. 15, 1959. Divided and this application Sept. 11, 1959, Ser. No. 839,526
Claims priority, application Great Britain Mar. 26, 1954
11 Claims. (Cl. 95—63)

The present invention relates to photographic shutters and especially to crank mechanism for operating such shutters of the kind comprising a spring which is wound up to drive the crank and an escapement which permits the crank to rotate through half a revolution at a time. The crank is therefore brought suddenly to rest and in the case of a shutter working at high speed while having a large aperture, it is brought very violently to rest. The terms "high speed" and "large aperture," are, of course relative, but to give an example the actuation of a shutter to give an exposure down to 1/500 second and controlling an aperture of 1¾ inch diameter represents the sort of values which are contemplated.

The present invention consists in the provision of a braking mechanism which comes into operation after the crank has been released, but before it comes to rest. With an escapement in the form of an escape tooth rotating with the crank and a rocking escapement lever having two abutments coacting with the escape tooth, the braking mechanism may be constituted by a part circular projection extending rearwardly of the tooth, and a braking surface adjacent each abutment on the lever which coacts with the part circular projection to brake the movement of the crank before it comes to rest.

Another problem presented by high speed shutters is the bringing of the obturating members of the shutter itself to rest without undue shock due to inertia loads. To deal with this problem according to the invention the mechanism by which the movement of the obturating mechanism is conveyed from the energy source includes a coupling which when the load exceeds a predetermined value releases but also applies a substantial resistance to relative motion of the two parts. Thus, when the side of the coupling which is attached to the energy source is brought to rest the obturating members can continue in movement until brought to rest by the resistance opposing the resulting relative motion of the two parts of the coupling. The resistance could be provided by a dashpot or like fluid controlled device, but it is usually difficult to accommodate means giving a resistance of this kind and instead a frictional resistance may be employed.

A particular construction comprises a pin forming one part of the coupling and an apertured link forming the other part, the aperture being extended by a slot of slightly smaller width than the diameter of the pin and the sides of the link where it is slotted being sufficiently resilient to enable the pin to spread the sides of the link and move along the slot; to avoid excessive stresses when the pin first enters the slot, the slot may be continued from the opposite side of the aperture to that beyond which the pin moves. This extension on the opposite side can, of course, be narrower than the slot into which the pin moves and at its remote end it may terminate in a circular hole to reduce the risk of fatigue cracks. To keep wear at low value, the pin and link may be of hardened steel.

Such a link can conveniently be used in a shutter of the type in which successive movements of the link in opposite directions produced successive exposures. In that case, the slot along which the pin moves may have a full diameter aperture at each end and this full diameter aperture may be continued on the other side by a narrow slot to avoid excessive stresses as above described. A shutter having blades with a planetary mounting as described in my application Serial No. 496,383, filed March 24, 1955, now Patent No. 2,916,979, for Photographic Shutters can easily be arranged so that the blades rock in opposite directions alternately at each successive exposure. In itself, a shutter so arranged is well known and merely requires a form of blade which with a single aperture has a portion on each side of the aperture wide enough to obturate the aperture or the appropriate part of the aperture which the shutter controls. This type of shutter is usually used close to the camera lens, generally within the lens as near as possible to the location of the stop as the aperture here is the smallest anywhere in the whole optical system from the object to the image.

When this feature of the invention is applied to a shutter in which successive exposures are effected by alternate movement of the link in opposite directions as by successive half revolutions of a crank the connecting rod may then constitute the link with an aperture at each end of the slot. The parts should be so proportioned that the pin just travels from one aperture to the other at the highest shutter speeds. Then at lower speeds it may not travel the whole way, but this is not important if the parts are so proportioned that the shutter will close even if the pin does not leave the aperture at all.

Such a crank mechanism is commonly actuated by winding up a spring which drives the crank and controlling the crank by an escapement which permits it to rotate through half a revolution at a time.

A still further development is concerned with the winding of the spring in a mechanism of this kind. It is difficult to arrange such a spring to cover a large range of exposure. To make better provision, the invention makes use of two springs in parallel, one comparatively light for low speeds and the other comparatively heavy for high speeds. The light spring is always in action but a predetermined amount of lost motion is provided in the winding of the heavy spring e.g. a slot covering say 180° in which one end of the spring is movable. Thus in winding up from a condition of no tension, winding of the light spring starts at once, while winding of the heavy spring does not start until the lost motion has been taken up. During any further winding both springs are wound up together.

The invention will be further described with reference to the accompanying drawings which illustrate an example.

Figure 3:
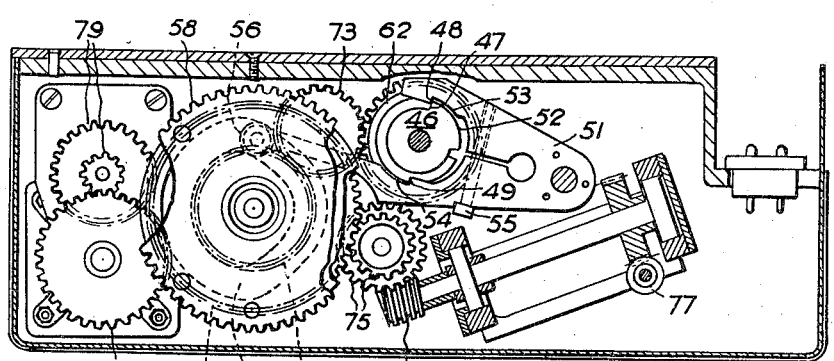

FIGURE 1 is an elevation with some parts in section, of mechanism according to the present invention, FIGURE 2 is an elevation partly in section on the line II—II of FIGURE 1, FIGURE 3 is a plan taken partly in section on the line III—III of FIGURE 1, FIGURE 4 is an underneath plan view of part of a shutter operated by mechanism according to the present invention, and FIGURE 5 is a detail of part of FIGURE 4.

The shutter operating mechanism illustrated includes a crank 42 rotated half a revolution at a time.

The mechanism for rotating the crank includes a shaft 46 carrying the crank, to which a spring load is applied and carrying an escape tooth 47 with which coact abutments 48, 49 on a rocking lever 51. In principle such an escapement is well known. In FIGURE 3 the tooth 47 is checked by the abutment 48, and the next movement of the lever will be clockwise, thus releasing the tooth 47 which rotates counterclockwise and will then be checked by the abutment 49. To lessen the blow of the tooth against the abutment, behind the tooth is provided a surface 52 concentric with the shaft 46, and the lever 51 has two corresponding braking surfaces 53, 54. Thus, at the next step from the position shown in FIGURE 3 before the tooth 47 reaches the abutment 49, the surface 52 will come into engagement with the surface 54, thus braking the movement of the rotating parts a little before the tooth engages the abutment. The same will happen on the next movement when the surface 52 will engage the surface 53. To enable the precise degree of braking to be adjusted, the lever 51 is split and the two parts can be drawn together by a screw 55.

At slow shutter speeds the braking action may bring the crank to rest before the tooth 47 reaches the next abutment but owing to the relatively small length of the braking surfaces 53, 54, provided the usual dimensional relationships are maintained in the shutter mechanism there is no risk of the crank coming to rest before the shutter has closed. Nor will there be any interference with the proper action at the next exposure because the very first succeeding movement of the rocking lever 51 will disengage that brake which is in action and the shaft 46 will immediately rotate until the tooth 47 engages the adjacent abutment before the lever has moved far enough to move this abutment out of the way of the tooth 47.

In the illustrated example the lever 51 is carried by a shaft journalled by rubber bushes and is rocked by the aid of a roller 56 working in a cam groove 57 formed in a wheel 58 which is part of the mechanism for winding the spring as will be explained below so that as long as the mechanism is in operation the spring is wound up and the shutter actuated at each half revolution of the wheel 58. It will be understood however that the invention is not limited in this way and that where preferred the lever 51 may be rocked by any other convenient control arranged to stop the winding-up movement when the parts are ready for the next exposure. Thus at the termination of each winding operation a contact may be opened which stops the winding motor or preferably de-energises an electromagnetic clutch by which the winding motor is coupled to the winding mechanism and then when the shutter is released by operation of the lever 51 the movement of the parts may close the contact thus causing the spring to be wound again.

The spring loading of the shaft 46 is here arranged to enable a wide variation of load, and therefore a wide variation of exposure to be effected. To this end two springs 59, 61, in parallel are used, see FIGURE 2, the spring 59 being a light spring and serving for low speeds and the spring 61 a heavy spring serving for high speeds. One end of the spring 59 is coupled to a rotatable sleeve 62 and the other end to a sleeve 63 fast on the shaft 46. Thus all relative rotation in the winding up direction between the sleeves 62 and 63 winds up the light spring 59. One end of the spring 61 lies in a cut-away part of the sleeve 62 so that it can freely rotate through 180° in relation to this sleeve while the other end is anchored to the sleeve 63. Thus starting from a position in which the spring 61 is under no load and its one end is at the leading end of the cut-away the two sleeves are rotated relatively in the winding up direction through 180° before any winding up of the spring 61 takes place, in other words the heavy spring 61 is coupled with lost motion between the sleeve 62 which is part of the winding means, and the shaft 46 to which the sleeve 63 is fast, and this lost motion of 180° has to be taken up before the winding up of the heavy spring 61 commences.

The winding of the springs is effected from an electric motor 64, which through worm gearing 65, and a pinion 66, rotates the wheel 58 with which is integral a bevel wheel 67. With the bevel wheel 67 mesh two further bevel wheels 68 borne on a spider 69, and with which meshes another bevel wheel 71 integral with a gear wheel 72 which through an idler wheel 73 rotates the sleeve 62 which has gear teeth formed in its peripery.

Manifestly a drive will only be transmitted through the bevel gearing if the spider 69 remains stationary or under control. To this end the spider has fast to it a gear wheel 74 which can be held stationary or rotated by a train of gearing 75 and two stages of worm gearing 76, 77 driven by an electric motor 78. When the motor 78 is stationary the worm gears 76, 77 lock the whole train while when the motor is rotated additional movements can be imparted to the wheel 72 beyond that imparted through the wheel 58. Thus by means of the motor 78 any degree of preloading can be applied to the springs while when the motor 78 is stationary, the action of the rest of the mechanism is to wind the spring up half a turn for each release of the shutter. It will be understood that starting from a position of no tension on the spring the first half revolution will only tension the light spring 59 while anything beyond half a revolution will tension both springs. Auxiliary gearing 79 is actuated from the wheel 74 to cooperate with remote indicating or controlling means such as a balanced potentiometer system so that the load applied to the springs can be indicated or controlled at a distance.

The shutter itself must be of a type which can be actuated by the alternate movements which can be derived from the half revolution of the crank 42. Various such types are known and the type in which a plurality of symmetrical blades are pivoted to move to and fro between end positions in which they obturate the shutter aperture and during each such movement uncover the aperture may be instanced. Such a shutter is indicated in outline in FIGURE 4 and is actuated through a pin 23. The crank 42 is coupled by a link 24 to the pin 23 and at each half revolution of the crank, the pin is thereby moved through a distance adequate to open and reclose the shutter with sufficient margin to insure the reclosing even if at low speeds the crank comes to rest before the tooth 47 reaches the next abutment 48 or 49 as above mentioned. The pin 23 engages in a slot 43 in the link (see FIGURE 5), this slot having two end portions of the same diameter as the pin 23 joined by a part of somewhat less width, and this part of the link is made resilient by two further slots 44 terminating in round holes 45 to reduce the likelihood of fatigue cracks being started. From the position shown in FIGURE 4 in which the pin 23 is at the lower end of the slot 43, the next half revolution of the crank 52 will carry the pin 23 upwards. At the end of the movement, the moving parts of the shutter will still have considerable kinetic energy due to their inertia and the pin 23 will spring the sides of the slot 43 apart and move towards the other end of the slot. The parts should be so proportioned that the pin will reach the other end of the slot at a speed approaching the highest. At lower speeds, if it does not reach the other end of the slot this is not of great importance. The length of the slot is made such in relation to the total movement of the link that even if the pin does not move along the slot at all the shutter will have reached its closed position. The resilient pressure of the sides of the slot on the pin 23 constitute a friction brake which damps down the movement and thus avoids excessive shock when the shutter closes.

This application is a divisional application of United States application Serial No. 496,383, filed March 24, 1955, now Patent No. 2,916,979, for Photographic Shutters.

I claim:

1. Mechanism for operating a photographic shutter comprising a crank, a spring for driving the crank, means for winding up the spring between successive half revolutions of the crank, an escape tooth rotating with the crank, a rocking escapement lever having two abutments coacting with the escape tooth thereby to allow the crank to rotate through half a revolution each time the lever is rocked from one end position to the other, a part circular projection concentric with the axis of the crank and extending rearwardly of the tooth, and two braking surfaces adjacent the abutments on the lever respectively located to contact the part circular projection to brake the movement of the crank before it comes to rest against either abutment.

2. Means for opening and closing a photographic shutter including an energy source for operating the shutter, and a coupling between the energy source and the shutter, said coupling comprising a pin forming one part of the coupling and an apertured link in which said pin engages forming the other part of the coupling, the aperture being extended by a slot of slightly smaller width than the transverse dimension of the pin and the sides of the link where it is slotted being sufficiently resilient to enable the pin to spread the sides of the link and move along the slot under the friction due to the resilience of the sides of the link.

3. Means as set forth in claim 2 wherein said aperture is extended on the opposite side to said slot by another narrow slot to increase the resilience of the link.

4. Means for opening and closing a photographic shutter in which the operative parts move in opposite directions at successive operations comprising an energy source for operating the shutter, and a coupling between the energy source and the shutter consisting of a pin and a link having a pair of apertures to fit said pin, said link having a slot of slightly smaller width than the transverse dimension of the pin joining said apertures, the sides of the link where it is slotted being sufficiently resilient to enable the pin to spread the sides of the link and move along the slot from one aperture to the other under the friction due to the resilience of the sides of the link.

5. Operating mechanism for a photographic shutter comprising a shaft, means for permitting said shaft to rotate through a predetermined angle corresponding to one operation of the shutter, a light spring and a heavy spring, spring winding means, said light spring having one end coupled to said shaft and the other end coupled to said winding means so that all relative rotation in the winding up direction between the winding means and the shaft winds up said light spring, said heavy spring being coupled with lost motion between said winding means and said shaft so that relative rotation in the winding up direction between said winding means and said shaft does not commence to wind up said heavy spring until the lost motion has been taken up.

6. Operating mechanism as set forth in claim 5 wherein one end of said heavy spring cooperates with a sleeve having a cutaway extending over 180° to provide the lost motion.

7. Crank mechanism for operating a photographic shutter of the kind comprising a spring which is wound up to drive the crank, an escapement which permits the crank to rotate through half a revolution at a time, and a coupling between the crank and the shutter, said mechanism also including a braking mechanism acting upon the crank which comes into operation each time after the crank has been released but before it comes to rest, a coupling between the crank and shutter, means which holds the coupling in action only as long as the load remains below a predetermined value so that when the load exceeds that value the shutter can continue moving when the crank has come to rest, and means which applies a substantial braking resistance to such continued movement.

8. Crank mechanism for operating a photographic shutter of the kind comprising a spring which is wound up to drive the crank, an escapement which permits the crank to rotate through half a revolution at a time, a braking mechanism which comes into operation each time after the crank has been released but before it comes to rest, and a coupling between the crank and shutter wherein said coupling comprises a pin and a link having a pair of spaced apertures to fit said pin, said link having a slot of slightly smaller width than the transverse dimension of the pin joining said apertures, the sides of the link where it is slotted being sufficiently resilient to enable the pin to spread the sides of the link and move along the slot from one aperture to the other under the friction due to the resilience of the sides of the link.

9. Crank mechanism as set forth in claim 8 in which the spring which is wound up includes a light spring and a heavy spring and a lost motion connection between the two arranged so that winding of the light spring commences at once but winding of the heavy spring does not commence until the lost motion has been taken up.

10. Operating mechanism for a photographic shutter comprising a shaft, control means which at each operation releases said shaft to rotate in one direction through a predetermined angle corresponding to one operation of the shutter, spring winding means including a sleeve coaxial with the shaft, a light spring coupled at one end to said shaft and at the other end to said sleeve so that all relative rotation of the winding means in the same direction as said shaft rotates winds up said light spring, a driving surface on said sleeve formed at the trailing end of a cutaway of substantial angular length of the sleeve and a heavy spring anchored at one end to the shaft and having its other end projecting into said cutaway into the path of said driving surface so that starting from a position in which the last mentioned end of the heavy spring is at the leading end of the cutaway, winding up of the sleeve spring does not commence until relative rotation of said sleeve in the direction in which the shaft rotates through an angle equal to the length of the cutaway has taken place whereupon said driving surface engages said other end of the heavy spring and upon any further relative rotation of the sleeve the heavy spring is wound up.

11. Operating mechanism as set forth in claim 10 including means for rotating said sleeve through a desired angle while the remainder of the mechanism remains stationary thereby imposing a desired pre-load on at least the light spring, and means for thereafter rotating the sleeve through said predetermined angle prior to each operation of said control means.

References Cited in the file of this patent
UNITED STATES PATENTS

| | | |
|---|---|---|
| 2,198,729 | Junghans | Apr. 30, 1940 |
| 2,878,735 | Willcox | Mar. 24, 1959 |
| 2,925,763 | Venning | Feb. 23, 1960 |